United States Patent
Schuster et al.

[19]

[11] Patent Number: 6,161,952
[45] Date of Patent: Dec. 19, 2000

[54] HEADLIGHT FOR VEHICLE IN ACCORDANCE WITH PROJECTION PRINCIPLE

[75] Inventors: Kurt Schuster, Reutlingen; Gerhard Weihing, Gomaringen, both of Germany

[73] Assignee: Robert Bosch GmbH, Stuttgart, Germany

[21] Appl. No.: 09/262,700

[22] Filed: Mar. 4, 1999

[30]     Foreign Application Priority Data

Apr. 1, 1998 [DE]  Germany ............................ 198 14 479

[51] Int. Cl.⁷ ............................... B60Q 1/04; F21V 13/12
[52] U.S. Cl. .......................... 362/539; 362/309; 362/522; 362/331; 362/333
[58] Field of Search ..................................... 362/331–334, 362/308, 309, 521, 522, 538, 539

[56]              References Cited

U.S. PATENT DOCUMENTS

| | | | |
|---|---|---|---|
| 1,081,211 | 12/1913 | Churchill | 362/309 |
| 1,399,973 | 12/1921 | Limpert | 362/309 |
| 1,557,563 | 10/1925 | Dahlstrom | 362/333 |
| 1,571,139 | 1/1926 | Nolen | 362/522 |
| 2,700,098 | 1/1955 | Brouwer | 362/308 |
| 2,798,147 | 7/1957 | Orsatti | 362/309 |
| 4,814,950 | 3/1989 | Nakata | 362/539 |

FOREIGN PATENT DOCUMENTS 32 18 703 A1  11/1983  Germany .

*Primary Examiner*—Alan Cariaso
*Attorney, Agent, or Firm*—Michael J. Striker

[57]                ABSTRACT

A headlight for a vehicle operating in accordance with the projection principle, the headlight has a reflector, a light source, a lens through which a light reflected by the reflector passes, at least one partially light-permeable element which surrounds the lens at least over a part of its periphery, so that light which is emitted by the light source and not engaged by the reflector passes through and is collected by the at least one element, wherein, the reflector and the lens being formed so that light which is reflected by the reflector and passes through the lens forms an upper bright-dark limit, the element being formed at least locally as a fresnel lens with ring-shaped optical profiles, and further optical profiles arranged at least in a part of a beam path of the light passing through the element and deviating the light so that it illuminates a region in front of the vehicle above the bright-dark limit formed by the light reflected by the reflector and passing through the lens.

8 Claims, 4 Drawing Sheets

_US 6,161,952_

HEADLIGHT FOR VEHICLE IN ACCORDANCE WITH PROJECTION PRINCIPLE

BACKGROUND OF THE INVENTION

The present invention relates to a headlight for vehicle, which operates in accordance with a projection principle.

Headlights of the above mentioned general type are known in the art. One of such headlights is disclosed for example in the German patent document DE 32 18 703 A1. This headlight has a reflector, a light source and a lens through which the light reflected by the reflector passes. Moreover, the headlight has a light-permeable element which surrounds the lens at least over a part of its periphery. The light emitted by the light source which is not engaged by the reflector can pass through the light-permeable element and be collected. For this purpose the element has prisms for deviating the passing light. With this construction of the element, when the light source is turned on, the illuminated surface of the reflector is increased relative to the surface of the lens, so that by the headlight no or only a small subjective screening is caused. The light bundle which is reflected by the reflector and passes through the lens has a sharp bright-dark limit which is advantageous for avoiding a blinding of a counter traffic, but on the other hand has the disadvantage that high ranged objects such as for example traffic screens or direction screens are not illuminated or illuminated insufficiently and therefore are difficult to recognize by the vehicle driver. Also, only a part of the light passing through the element can be engaged by the prisms of the element. The known headlight also has the disadvantage that when the light source is turned off, the element is perceived as dark and the headlight has an undesired, non uniform appearance image.

SUMMARY OF THE INVENTION

Accordingly, it is an object of the present invention to provide a headlight for a vehicle operating in accordance with the projection principle which avoids the disadvantages of the prior art.

In keeping with these objects and with others which will become apparent hereinafter, one feature of present invention resides, briefly stated, in a headlight for a vehicle, in which the element at least partially is formed as a fresnel lens with ring-shaped optical profiles, and at least in a part of a beam path of the light passing through the element has further optical profiles which deviate the light so that it illuminates a region in front of the vehicle above the bright-dark limit of the light reflected by said reflector and passing through said lens.

When the headlight is designed in accordance with the present invention, with the element formed as fresnel lenses, the light emitted by the light source during passage through the element can be collected with a high efficiency. Due to the optical profiles of the disk, the light passing through the element also is deviated so that a sufficient illumination above the bright-dark limit is provided.

In accordance with another feature of the present invention, the further optical profiles are arranged on a light-permeable disk which is located in a light outlet direction after the element, and the disk is formed as a cover disk of the headlight.

In accordance with still a further feature of present invention, at least partially reflecting layer is arranged in the beam path of the light passing through the element, at least locally, facing in the light outlet direction. With the at least partially reflecting layer in the turned-off condition of the headlight a brilliant appearance is provided. Due to the collecting action of the fresnel lenses, despite the partial screening of the light passing through the element by the layer, still a sufficient illumination of the region around the lens is provided.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
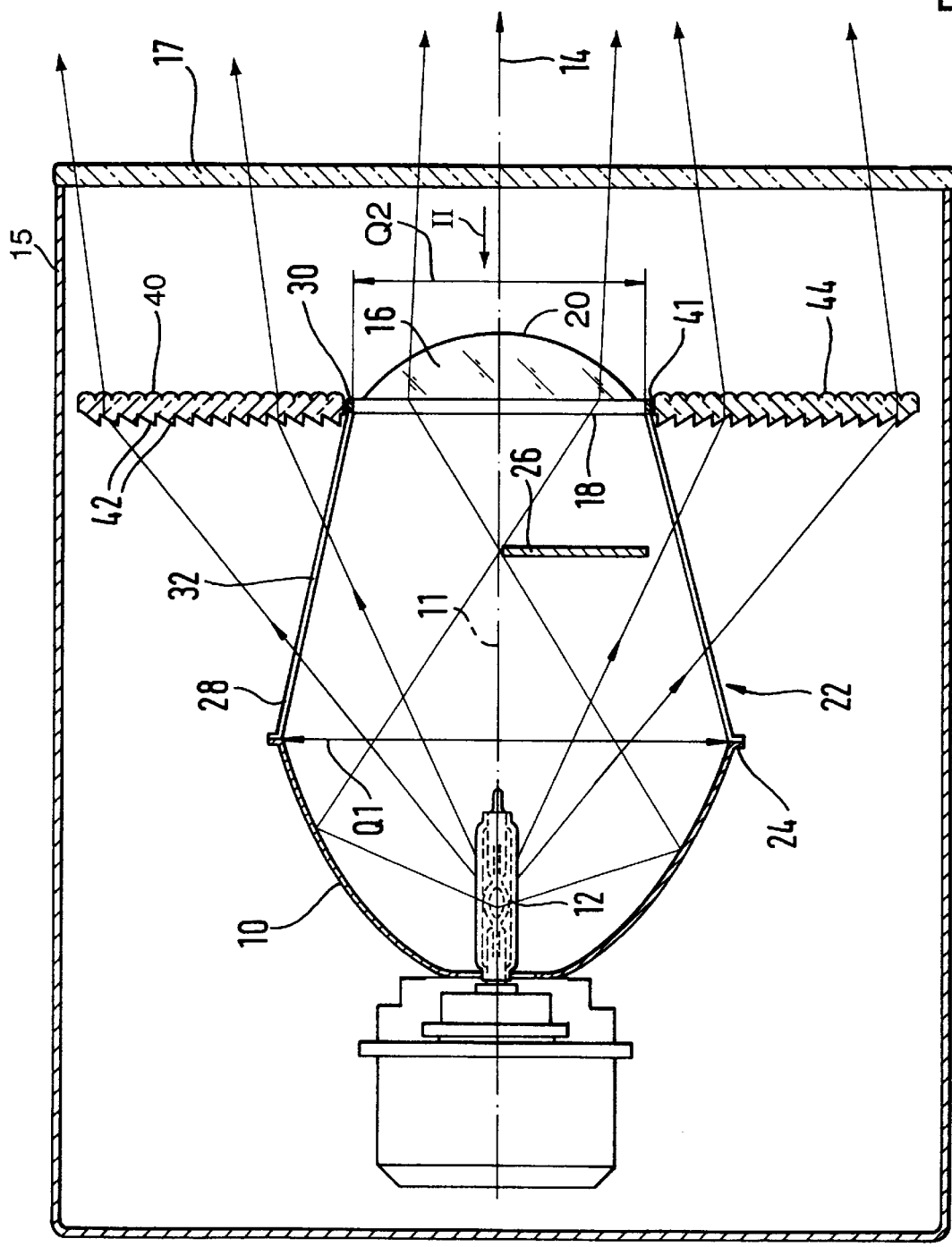
FIG. 1 is a view showing a headlight in accordance with a first embodiment of the present invention in a vertical longitudinal section.

A headlight as shown in FIGS. 1–4 is provided for a vehicle, in particular a motor vehicle. It operates in accordance with a projection principle and serves for producing at least a dim light. The headlight has a reflector 10 which is composed of a synthetic plastic or metal, and a light source 12 inserted in an apex region of the reflector. The light source 12 can be an incandescent lamp, a gas discharge lamp, or another suitable lamp. A lens 16 composed of glass or synthetic plastic is arranged after the reflector 10 as considered in the light outlet direction 14. The lens 16 can have for example a plane side 18 which faces the reflector 10 and an opposite convex curved side 20.

The lens 16 is held in a supporting element 22 which can be connected with a front edge 22 of the reflector 10, which faces in the light outlet direction 14. The reflector 10 and the lens 16 can be accommodated in a housing 15 which has a light outlet opening covered with a light-permeable disk 17 of glass or synthetic plastic. The cover disk 17 can be smooth, so that light can pass through it without being changed. Alternatively, it can be provided at least partially with optical elements, which deviate the passing light, for example disperses the light.

The light emitted by the light source 12 is reflected by the reflector 10 as a converging light bundle which passes through the lens 16 and is deviated. The lens 16 acts as a collecting lens. The light passing through it is refracted to the optical axis 11 of the reflector 10. The reflector 10 can have at least approximately ellipsoidal shape, and ellipsoid-like shape, or a numerically determined shape which is produced from the characteristic of the light bundle reflected by the reflector 10.

A light-impermeable screen 26 is provided between the reflector 10 and the lens 16. It is arranged substantially under the optical axis 11. Only a part of the light bundle reflected by the reflector 10 can pass on it. The light bundle passing the screen 26 contains a bright-dark limit which is determined by the upper edge of the screen 26. It is formed by the lens 16 as the bright-dark limit of the dim light bundle exiting the headlight. Alternatively, the screen 26 can be dispensed with when the shape of the reflector 10 is formed so that the light bundle reflected by the reflector already has the required bright-dark limit which is formed by the lens 16.

The reflector 10 at its front edge 24 has a cross-section Q1, and the lens 16 has a cross-section Q2 which is smaller than the cross-section Q1. The supporting element 22 can be provided with one or several webs 28. They extend from the front edge 24 of the reflector 10 close to the lens 16, where they can be connected with one another for example by a ring-shaped portion 30 in which the lens 16 is held with its edge. The light emitted by the light source 12 and not engaged by the reflector 10 can pass through openings 32 which remain between the webs 28.

The webs 28 are maintained preferably as small as possible to provide large openings 32 between them, so that a corresponding great part of the light emitted by the light source 10 can pass through them. Alternatively, the supporting element 22 can be also composed of at least partially light-permeable material, for example synthetic plastic or glass. In this case, the supporting element 22 does not have to provided with any openings.

Figure 2:
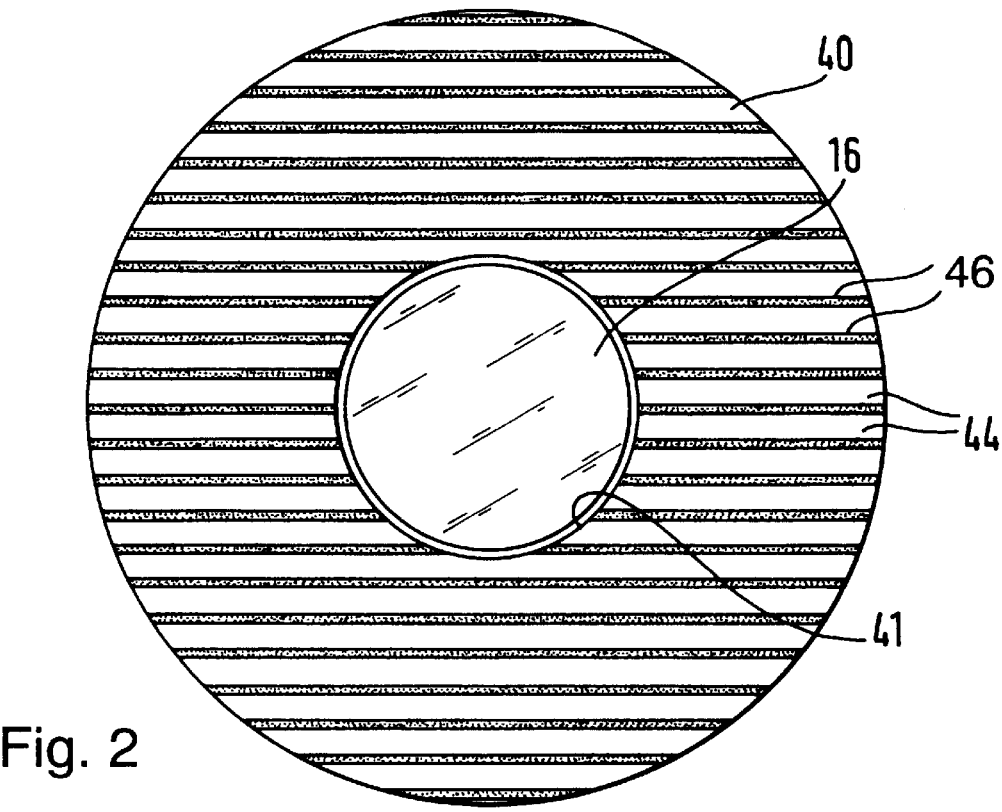
FIG. 2 is a view showing the inventive headlight as seen in direction of the arrow 11 of FIG. 1.

The headlight further has at least one element 40 which surrounds the lens 16 over at least a part of its periphery. FIGS. 1 and 2 show the first embodiment of the headlight. The element 40 surrounds the lens 16 over its whole periphery and is composed of a light-permeable material, such as for example glass or synthetic plastic. The lens 16 and the element 40 can be of one-piece with one another. The element 40 at least locally, but preferably over its total extension, is formed as a fresnel lens and has a plurality of concentric, ring-shaped optically active profiles 42. The optical profiles 42 are arranged at the side of the element 40 which faces the reflector 10 opposite to the light-outlet direction 14.

The optical profiles 40 are formed for example wedge-shaped. They deviate the light passing through the element 40 toward the optical axis 11 and thereby collect the light. The optical profiles 42 can be formed for example so that the light emitted by the light source 12 after passage through them extends substantially parallel to the optical axis 11. The element 40 can be arranged as shown in FIG. 1 so that in direction of the optical axis 11 it has substantially the same distance from the reflector 10 as the lens 16. Alternatively, the element 40 can have in direction of the optical axis 11 also another distance from the reflector 10 as the lens 16 and therefore offset to the lens 16.

The element 40 has an opening 41 for passage of the lens 16. In the first embodiment shown in FIG. 1, the element 40 is substantially flat. Alternatively, the element 40 can be for example convex or concave with a corresponding curvature. The element 40 has for example a round shape as shown in FIG. 2. The shape of the element 40 can be selected arbitrarily, for example also oval or cornered, depending on what appearance of the headlight is desired. It can be provided that the element 40 surrounds the lens 16 only over a part of its periphery, and for example is arranged laterally near the lens 16 or above and/below the lens 16.

At its side facing in the light outlet direction 14, the element 40 is provided at least locally with further optical profiles 44 which deviate the passing light. The further optical profiles 44 of the element 40 are formed so that the light passing through it is deviated upwardly and forms a light bundle extending above the bright-dark limit of the light bundle reflected by the reflector 10 and passing through the lens 16 on the screen 26. The further optical profiles 44, as shown in FIG. 2, can be formed as substantially horizontally extending lenses which disperse light at one side upwardly.

Figure 5:
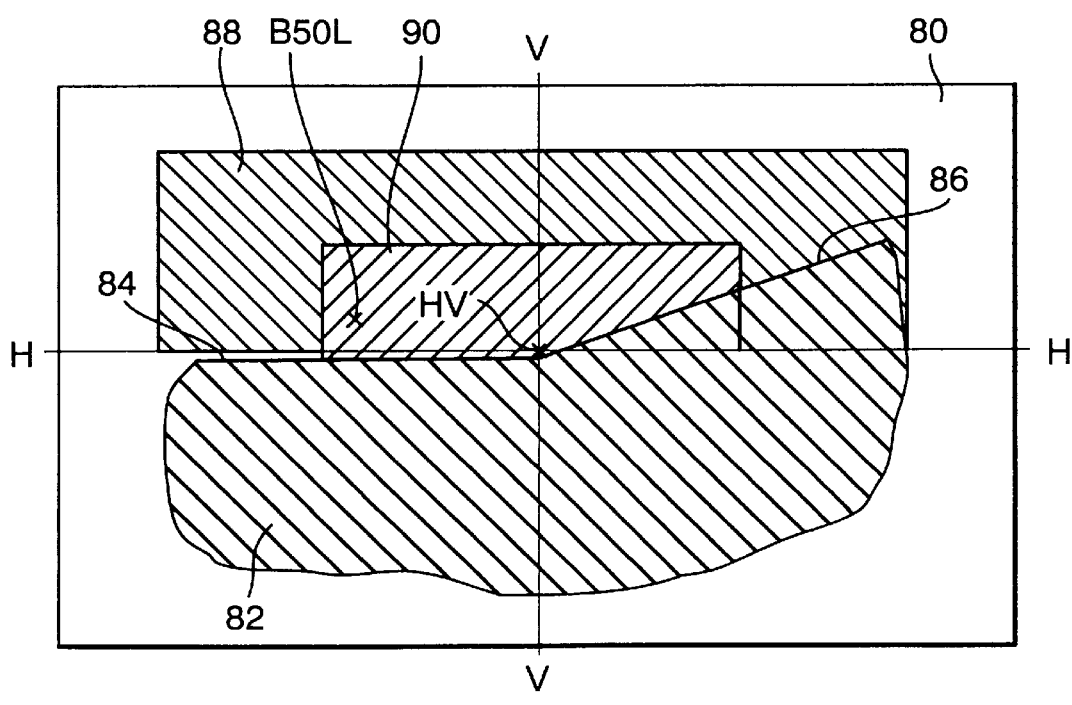
FIG. 5 is a view showing a measuring screen which is arranged in front of the inventive headlight and illuminated by the light emitted by the headlight.

FIG. 5 shows a measuring screen 80 which is arranged at a distance from the headlight and is illuminated by the light emitted by the headlight. The horizontal central plane of the measuring screen 80 is identified with HH, while the vertical central plane is identified with VV. The horizontal central plane HH and the vertical central plane VV intersect each other in a point HV. The light reflected by the reflector 10 and passing on the screen 26 through the lens 16 illuminates the measuring screen 80 in a region 82. The region 82 is limited upwardly by the bright-dark limit produced by the screen 26. In the shown embodiment, the reflector is formed for a right traffic and the bright-dark limit has a horizontally extending portion 84 at the counter traffic side or in other words at the left side of the measuring screen 80 under the horizontal central plane HH. At the traffic side, or in other words, at the right side of the measuring screen 80, the bright-dark limit has a portion 86 which extends from the horizontal portion to the right edge of the measuring screen 80 till above the horizontal central plane HH. Alternatively, the bright-dark limit can also have a substantially horizontal portion at the traffic side, which is arranged higher than the horizontal portion 84 of the counter traffic side. The distribution of the illumination intensities in the region 82 is provided by legal considerations, wherein in a zone above the point HV the highest illumination intensity are available. Above the bright-dark limit 84, 86, the measuring screen 80 is not illuminated or illuminated only insignificantly by the light bundle which is reflected by the reflector 10 and passes on the screen 26 through the lens 16.

The light which extends through the element 40 and is deviated upwardly by the further optical profiles 44 illuminates the measuring screen 80 in a region 88 arranged at a distance above the bright-dark limit 84, 86. The light passing through the element 40 acts in the region 88 to provide such an illumination, that the legal prescriptions are maintained over required average illumination intensities and maximum permissible highest illumination intensities. For example in the ECE regulations 20 which are accepted in Europe, a measuring point B 50 L is defined, in which the illumination intensity must amount maximum to 0.4 lux, to avoid blinding of the opposite traffic. With consideration of the legal prescriptions, the illumination intensity distribution in the region 88 can be freely selected. The illumination intensity distribution can be for example selected so that the region 90 of the measuring screen 80 located directly above the bright-dark limit 84, 86, which extends for example up to approximately 2° above the horizontal central plane HH and under substantially 4° at opposite sides of the vertical central plane 88, is illuminated only weakly by the light passing through the element 40. The region 88 which adjoins upwardly and laterally the region 90 extends for example vertically upwardly up to approximately 4° over the horizontal central plane HH and laterally at both sides of the vertical central plane W substantially up to 80 and is illuminated stronger than the region 90.

In accordance with a further embodiment of the inventive headlight, the side of the element 40 which faces the light outlet direction 14 can be provided at least locally with at least partially reflective coating 46. The coating 46 can be formed so that it is light-impermeable. Then it is arranged only locally on the element 40, to make possible a partial passage of the light emitted by the light source 12. The coating 46 can be formed by lines or rings. The light impinging from outside of the coating 46 is reflected by it. Alternatively, the coating 46 can be formed so that it is partially light-permeable and partially reflecting. In this case, the total surface of the element 40 can be covered by the coating 46, or only a part of its surface. The light emitted by the light source 12 can partially pass through the coating 46, so that it illuminates the region 88 of the measuring screen 80, while the light impinging from outside of the coating 46 is partially reflected.

The coating 46 can be composed preferably of metal, such as aluminum and can be applied by known methods on the element 40, for example by evaporation, sputtering, varnishing, printing or impregnating. The light permeability of the coating 46 can be varied by its thickness, and the light permeability reduces with increasing thickness. In order to provide a partial light permeability of the coating 46, it can have a small thickness, while for obtaining a high reflection degree, it can be provided with a correspodingly greater thickness. The coating 44 can be applied for example on the surfaces of the further optical profiles 44 of the element 40 which face in the light outlet direction 14.

Figure 3:
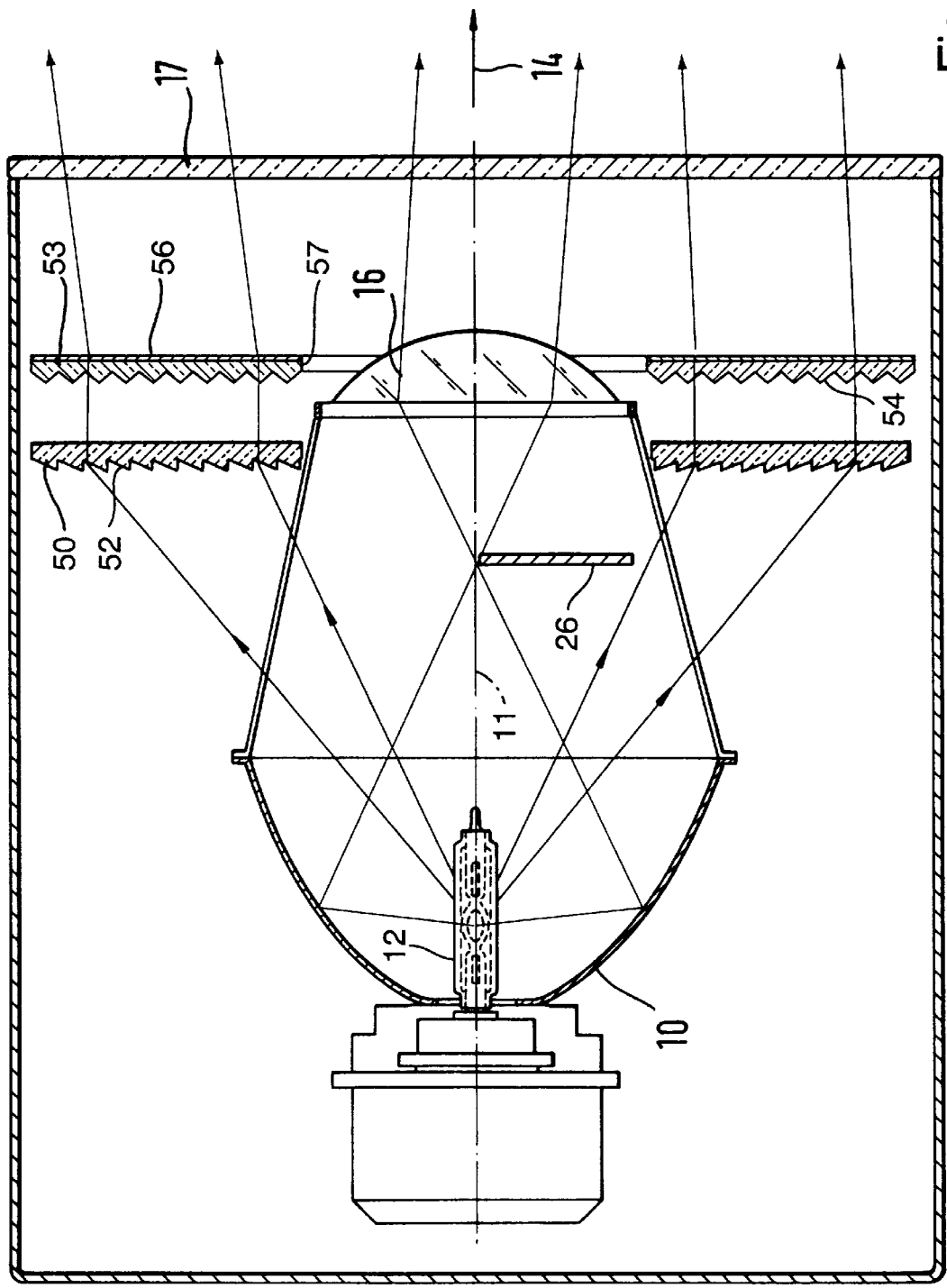
FIG. 3 is a view showing the inventive headlight in accordance with a second embodiment of the present invention in a vertical longitudinal section.

FIG. 3 shows the headlight in accordance with a second embodiment of the present invention in a section. The basic construction of the headlight with the reflector 10, light source 12, lens 16 and screen 26 is the same as in the first embodiment. The headlight in accordance with a second embodiment has an element 50 which surrounds the lens 16 at least over a part of its periphery and is also formed as a fresnel lens. It has the ring-shaped concentric optical profiles 52 which can be arranged on the side facing away of the light outlet direction 14 or facing in the light outlet direction 14 of the element 50. The element 50 has only the optical profiles 52 for forming a fresnel lens, while the other side of the element 50 is smooth. A light-permeable disk 53 is arranged after the element 50 in the light outlet direction 14. It extends at least over a part of the beam path of the light extending through the element 50. The disk 53 is provided at least locally with optical profiles 54. In their action they correspond to the further optical profiles 44 of the element 40 of the first embodiment. They deviate the light passing through the element 50, so that it illuminates the measuring screen 80 as explained above, in the region 88.

The optical profiles 54 can be arranged at the side of the disk 53 which faces opposite to the light outlet direction 14 or in the light outlet direction 14. The disk 53 can be formed substantially flat, or convex or concave with any curvature. At the side of the disk 53 which faces in the light outlet direction 14, a coating 56 is applied, which is, formed and arranged as the above described coating 46 of the element 40. The disk 53 can be provided in its central region with an opening 54. The light passing through the lens 60 can pass through the opening 57 without problems. Alternatively, the disk 53 can also extend over the beam path of the light passing through the lens 16. Then the disk 53 in the region of the beam path of the light passing through the lens 16 has no optical profiles 54 to provide an unimpeded passage of this light.

Figure 4:
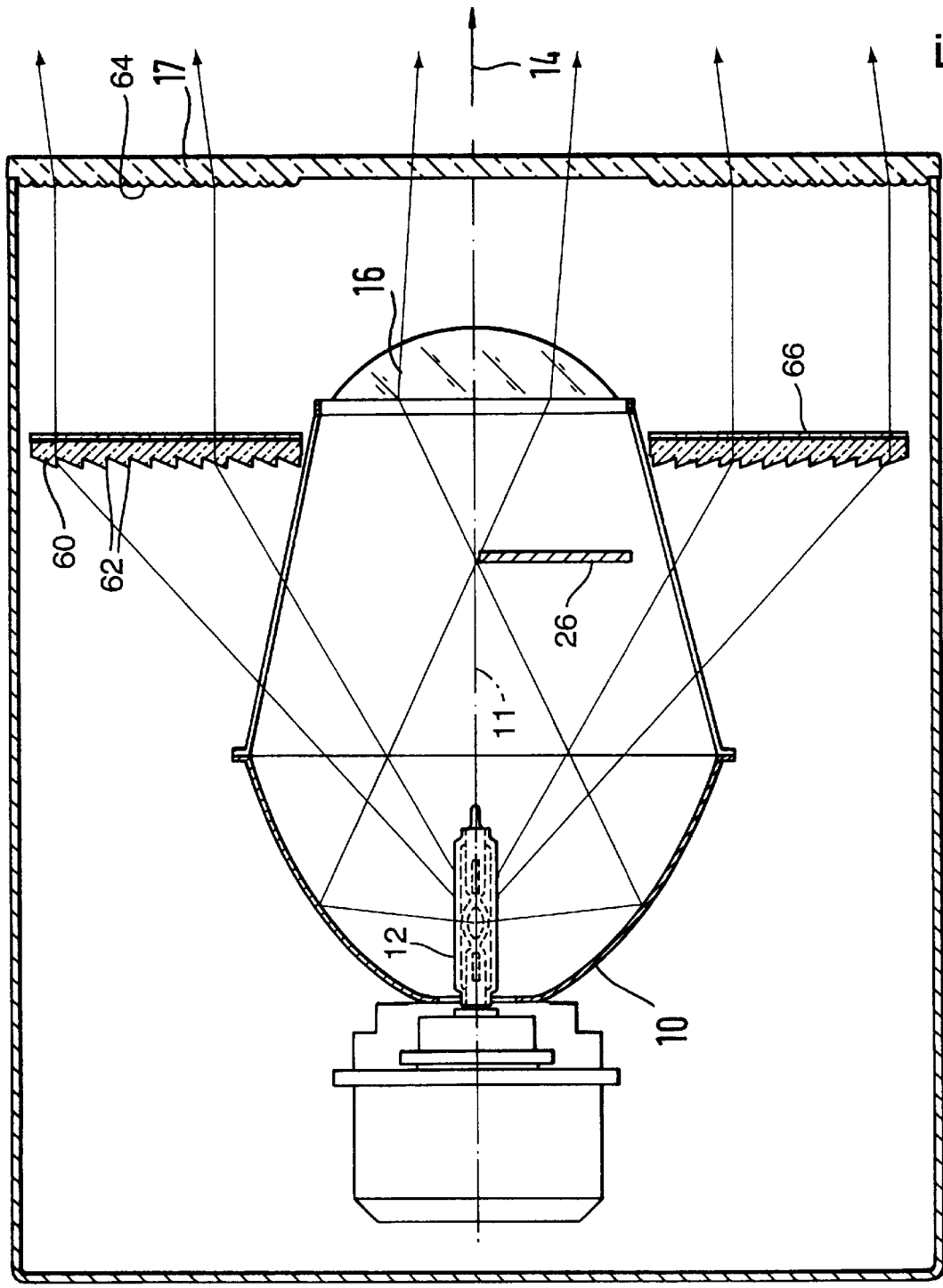
FIG. 4 is a view showing the inventive headlight in accordance with the third embodiment of the present invention in a vertical longitudinal section.

FIG. 4 shows a third embodiment of the headlight in accordance with the present invention in a section, in which the basic construction of the headlight with the reflector 10, the light source 12, the lens 16 and the screen 26 corresponds to that of the first embodiment. An element 60 surrounds the lens 16 at least over a part of its periphery and is formed as a fresnel lens. It has a ring-shaped, concentric optical profile 62 which can be arranged at the side of the element 60 facing opposite to the light outlet direction 14 or in the light outlet direction 14. The element 60 has only the optical profiles 62 for forming a fresnel lens, while the other side of the element 60 can be formed smooth.

At least in a part of the beam path of the light separated by the element 60, optical profiles 64 are arranged. They deviate upwardly the light passing through, so that it illuminates the region 88 of the measuring screen 80 of FIG. 5. The optical profiles 64 in accordance with a third embodiment of the invention are arranged on the cover disk. 17, preferably at its inner side facing opposite to the light outlet direction 14. The cover disk 17 has the optical profiles 64 only in a region, through which no light reflected by the reflector 10 and separated on the screen 26 by the lens 16 can pass. The cover disk 17 has the region through which the light passes which is reflected by the reflector 10 and separated on the screen 26 by the lens 16. This region of the cover disk 17 can be smooth or can be provided with optical profiles which are formed differently from the optical profiles 64. The element 60 can be provided at its side facing the light outlet direction 14 with at least partially reflecting coating 66. With respect to its design and arrangement, it is similar to the coating 46 described in the first embodiment. The coating 66 can be also arranged on a disk provided between the element 60 and the cover disk 17, at its side facing the light outlet direction 14.

It will be understood that each of the elements described above, or two or more together, may also find a useful application in other types of constructions differing from the types described above.

While the invention has been illustrated and described as embodied in headlight for vehicle in accordance with projection principle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A headlight for a vehicle operating in accordance with the projection principle, the headlight comprising a reflector; a light source; a screen arranged in a path of light emitted by said light source and reflected by said reflector; a lens through which a light reflected by the reflector passes; at least one partially light-permeable element which surrounds said lens at least over a part of its periphery, so that light which is emitted by said light source and not engaged by said reflector passes through and is collected by said at least one element, wherein, said reflector and said lens being formed so that light which is reflected by said reflector, passes said screen and passes through said lens and forms an upper bright-dark limit, said element is formed at least locally as a fresnel lens with ring-shaped optical profiles; and further optical profiles arranged at least in a part of a beam path of the light passing through said element and deviating this light so that it illuminates a region in front of the vehicle above said bright-dark limit formed by the light reflected by the reflector and passing said screen and passing through said lens.

2. A headlight as defined in claim 1, wherein said optical profiles for forming a fresnel lens are arranged at a side of said element which faces opposite to a light outlet direction, said further optical profiles being arranged at a side of said element which faces in the light outlet direction.

3. A headlight for a vehicle operating in accordance with the projection principle, the headlight comprising a reflector; a light source; a screen arranged in a path of light emitted by said light source and reflected by said reflector; a lens through which a light reflected by the reflector passes; at least one partially light-permeable element which surrounds said lens at least over a part of its periphery, so that light which is emitted by said light source and not engaged by said reflector passes through and is collected by said at least one element, said reflector and said lens being formed so that light which is reflected by said reflector passes said screen and passes through said lens and forms an upper bright-dark limit, said element being formed at least locally as a fresnel lens with ring-shaped optical profiles; further optical profiles arranged at least in a part of a beam path of the light passing through said element and deviating this light so that it illuminates a region in front of the vehicle above said bright-dark limit formed by the light reflected by the reflector and passing said screen and passing through said lens; and a light-permeable disk arranged after said element in the light outlet direction, said further optical profiles being arranged on said light-permeable disk.

4. A headlight as defined in claim 3, wherein said light-permeable disk is formed as a cover disk of the headlight.

5. A headlight as defined in claim 3, and further comprising a cover disk, said light-permeable disk being arranged between said element and said cover disk.

6. A headlight for a vehicle operating in accordance with the projection principle, the headlight comprising a reflector; a light source; a screen arranged in a path of light emitted by said light source and reflected by said reflector; a lens through which a light reflected by the reflector passes; at least one partially light-permeable element which surrounds said lens at least over a part of its periphery, so that light which is emitted by said light source and not engaged by said reflector passes through and is collected by said at least one element, said reflector and said lens being formed so that light which is reflected by said reflector, passes said screen and passes through said lens and forms an upper bright-dark limit, said element being formed at least locally as a fresnel lens with ring-shaped optical profiles; further optical profiles arranged at least in a part of a beam path of the light passing through said element and deviating this light so that it illuminates a region in front of the vehicle above said bright-dark limit formed by the light reflected by the reflector and passing said screen and passing through said lens; and at least partially reflecting layer which is arranged in the beam path of the light passing through said element at least locally and faces in the light outlet direction.

7. A headlight as defined in claim 6, wherein said layer is formed as a coating which is applied on a side of said element which faces in the light outlet direction.

8. A headlight as defined in claim 6, wherein said layer is formed as a coating which is applied on a side of a light-permeable disk which faces in the light outlet direction wherein said light-permeable disk is arranged between said element and a cover disk of the headlight.

* * * * *